US008447161B2

(12) United States Patent
Okazaki et al.

(10) Patent No.: US 8,447,161 B2
(45) Date of Patent: May 21, 2013

(54) IMAGING APPARATUS

(75) Inventors: Yoshinori Okazaki, Osaka (JP); Yasutoshi Yamamoto, Osaka (JP); Akira Seto, Osaka (JP); Tsutomu Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/353,421

(22) Filed: Jan. 19, 2012

(65) Prior Publication Data
US 2012/0189264 A1 Jul. 26, 2012

(30) Foreign Application Priority Data

Jan. 21, 2011 (JP) ................................ 2011-010403

(51) Int. Cl.
*H04N 5/77* (2006.01)
*H04N 9/80* (2006.01)
*H04N 5/232* (2006.01)
*H04N 9/64* (2006.01)
*H04N 5/222* (2006.01)

(52) U.S. Cl.
USPC ........... 386/227; 386/224; 386/239; 386/248; 348/211.13; 348/244; 348/333.01

(58) Field of Classification Search
USPC .................... 386/223–227, 239–248
See application file for complete search history.

(56) References Cited

U.S. PATENT DOCUMENTS

| 2004/0005497 | A1* | 1/2004 | Nunomaki et al. ............. 429/92 |
| 2007/0285542 | A1* | 12/2007 | Suzuki .......................... 348/294 |
| 2009/0112506 | A1 | 4/2009 | Kazama |

FOREIGN PATENT DOCUMENTS

| JP | 2004-5292 | 1/2004 |
| JP | 2007-28425 | 2/2007 |
| JP | 2007-312216 | 11/2007 |
| JP | 2009-33508 | 2/2009 |
| JP | 2009-111681 | 5/2009 |

* cited by examiner

*Primary Examiner* — Hung Dang
(74) *Attorney, Agent, or Firm* — Panasonic Patent Center

(57) ABSTRACT

An imaging apparatus includes a setting unit and a display controller configured to control the display unit. A plurality of recording modes include a first recording mode which generates heat so that the temperature in the case reaches a predetermined temperature, and a second recording mode which generates heat so that the temperature in the case cannot reach the predetermined temperature. The display controller determines the remaining recording time based on the temperature of a case, and determines whether the set-up recording mode is the first recording mode, and determines, based on a result of the determination, whether to display a remaining recording time which is determined based on the temperature in the case, on the display unit.

8 Claims, 12 Drawing Sheets

| MODE | MODE CONDITION | | RISING RATE IN CASE TEMPERATURE |
|---|---|---|---|
| FIRST MOVING IMAGE RECORDING MODE | FHD | 60 p | ↙ RISE |
| SECOND MOVING IMAGE RECORDING MODE | FHD | 60 i | ↗ SLIGHTLY RISE |
| THIRD MOVING IMAGE RECORDING MODE | HD | 60 p | ↗ SLIGHTLY DOWN |
| FOURTH MOVING IMAGE RECORDING MODE | HD | 30 p | ↘ DOWN |

HIGH QUALITY ↔ LOW QUALITY

Fig. 5

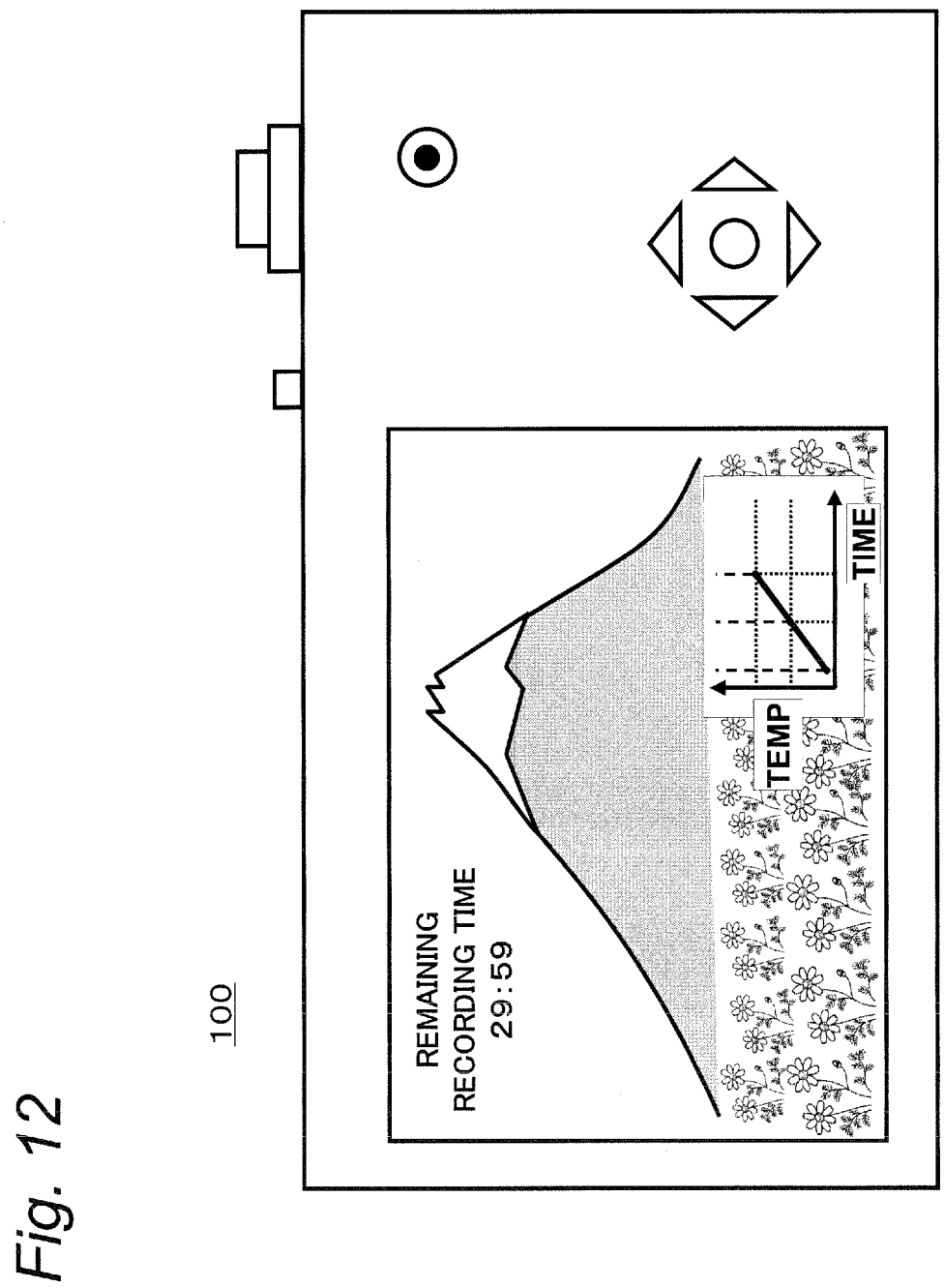

IMAGING APPARATUS

BACKGROUND

1. Technical Field

The technical field relates to an imaging apparatus capable of recording moving images.

2. Related Art

A digital camera equipped with an imaging sensor that captures a subject image formed through an optical system to generate image data has become widespread. The imaging sensor consumes power to perform various processing operations for generating image data. The imaging sensor generates heat when performing the various processing operations. In particular, when operation is performed continuously for a long period of time such as when a moving image recording process is performed, a rise in temperatures of the imaging sensor and an image processing engine becomes more significant due to heat generation.

Such a temperature rise inside the imaging apparatus may cause problems such as significant noise included in an output from the imaging sensor, trouble in user's holding a camera case, and deformation of a camera body or components. In recent years, with miniaturization of digital cameras, measures against heat generation of an imaging sensor have become an issue.

There is known a digital camera that, as measures against heat generation of an imaging sensor, provides a warning or limits a camera recording operation when a temperature sensed by a temperature sensor exceeds an allowable temperature. For example, JP2007-28425A discloses an art to perform control to stop a moving image recording operation which is an operation with high consumed power among operations of a digital camera and enable a still image recording operation with a low consumed power among the operations of the digital camera when a temperature measured by a temperature sensor exceeds an allowable temperature (70 degrees).

According to the art disclosed in JP2007-28425A, in a case when a user is recording a scene that the user wants to continuously record the moving image for a long period of time, when a temperature higher than the allowable temperature is sensed by the temperature sensor, the moving image recording operation is suddenly stopped. With this, the user can not record an important scene, which is inconvenient for the user.

To solve the above-described problems, an imaging apparatus is provided that allows a user (shooter) to grasp in advance a situation in which a moving image recording may be stopped due to a temperature rise inside the imaging apparatus.

SUMMARY

An imaging apparatus according to a first aspect is an imaging apparatus includes a moving image creating unit configured to create a moving image based on a subject image, a setting unit configured to set one of a plurality of recording modes which decide image quality of a moving image to be recorded, a temperature sensor configured to measure a temperature of a case of the imaging apparatus, a display unit capable of displaying a remaining recording time which indicates a time for which the imaging apparatus can record the moving image; and a display controller configured to control the display unit. The plurality of recording modes include a first recording mode in which, when the moving image creating unit continuously operates in the first recording mode, the moving image creating unit generates heat so that the temperature in the case reaches a first predetermined temperature, and a second recording mode in which, when the moving image creating unit continuously operates in the second recording mode, the moving image creating unit generates heat so that the temperature in the case cannot reach the first predetermined temperature. The display controller determines the remaining recording time based on the temperature in the case indicated by a result of the measurement by the temperature sensor, and determines whether the recording mode set by the setting unit is the first recording mode, and determines, based on a result of the determination, whether to display a remaining recording time which is determined based on the temperature in the case, on the display unit.

According to the imaging apparatus of the above aspect, a remaining recording time for a moving image is determined based on the temperature in the case and then is displayed on the display unit. Such display allows a user to grasp beforehand a situation in which the operation of the moving image recording may be stopped due to a temperature rise.

BRIEF DESCRIPTION OF DRAWINGS

FIG. 5 is a diagram for describing a rate of temperature rise for setup moving image recording modes.
FIG. 12 is a diagram showing display of a remaining recording time according to another embodiment.

DETAILED DESCRIPTION OF PREFERRED EMBODIMENTS

Embodiments will be described below with reference to the accompanying drawings.

First Embodiment

A digital camera of the present embodiment measures a temperature of or associated with a case, calculates a remaining time for recording a moving image variable depending on a temperature, based on the measured temperature, and displays the calculated remaining time on a display unit. With this arrangement, a user can recognize beforehand a situation in which stop of a moving image recording operation occurs, based on the measured temperature in the case.

1-1. Configuration

A configuration of a digital camera of the present embodiment will be described below using the drawings.

1-1-1. Configuration of Digital Camera

Figure 1:
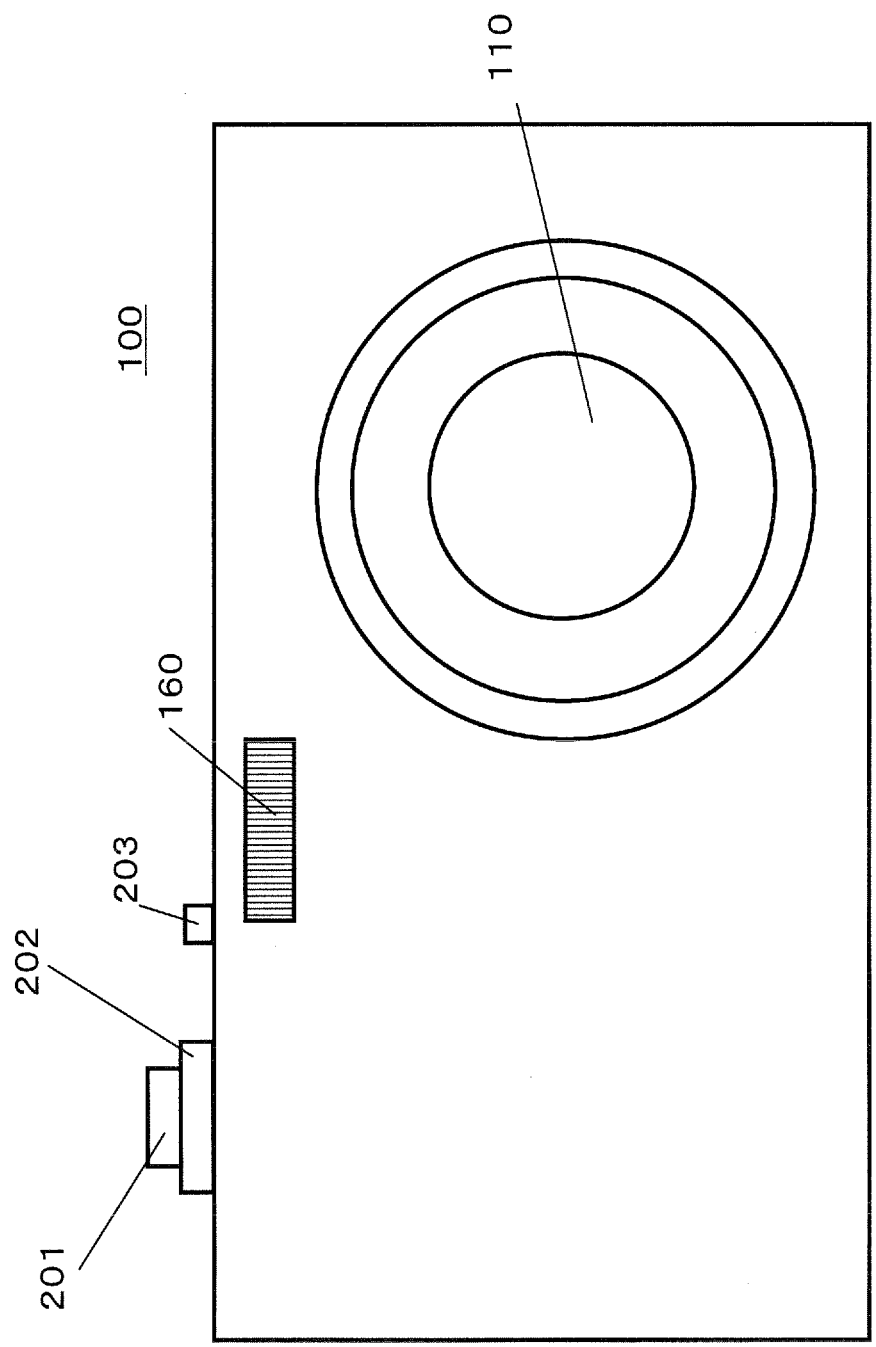
FIG. 1 is a front view of a digital camera.

FIG. 1 is a front view of a digital camera 100 of the present embodiment. The digital camera 100 has, at the front face thereof, a lens barrel that contains an optical system 110, and a flash 160. In addition, the digital camera 100 has, at the top face thereof, operation buttons such as a release button 201, a zoom lever 202, and a power supply 203.

Figure 2:
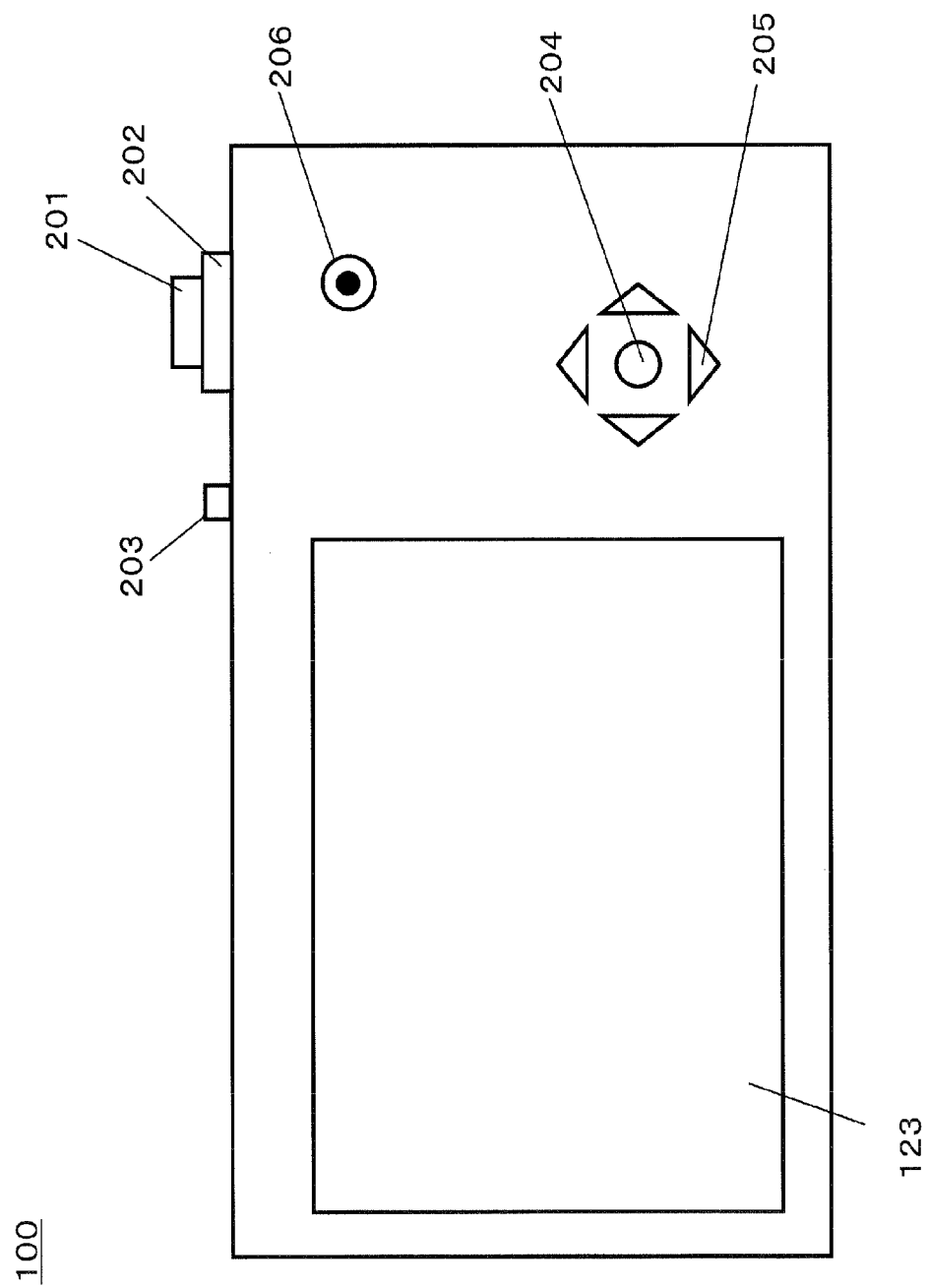
FIG. 2 is a back view of the digital camera.

FIG. 2 is a back view of the digital camera 100. The digital camera 100 has, at the back face thereof, a liquid crystal display monitor 123 and operating buttons such as a moving image recording button 206, a center button 204, and a cross button 205.

Figure 3:
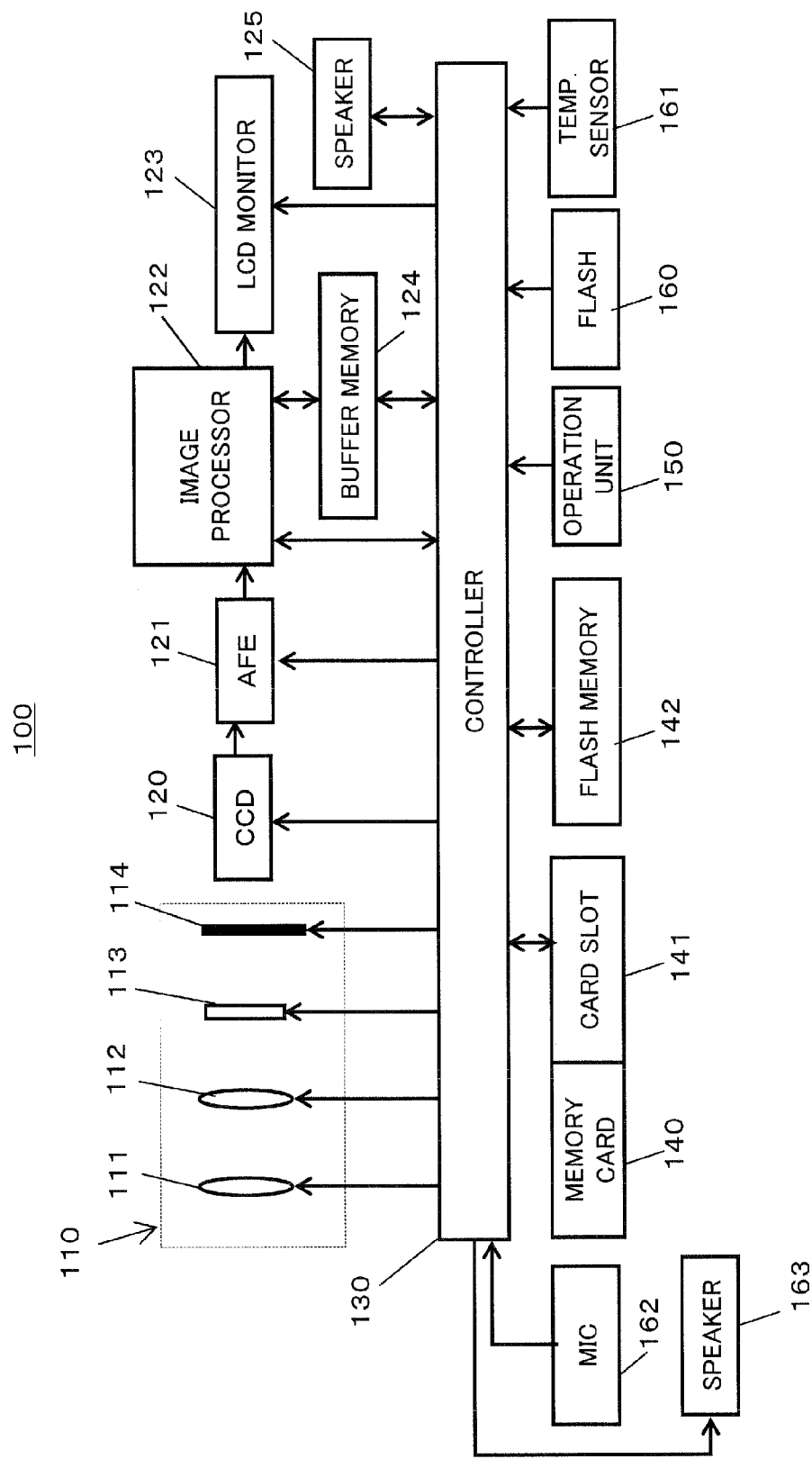
FIG. 3 is an electrical configuration diagram of the digital camera.

FIG. 3 is an electrical configuration diagram of the digital camera 100. The digital camera 100 captures, with a CCD image sensor 120, a subject image formed through the optical system 110. The CCD image sensor 120 generates image information based on the captured subject image. The image information generated by the CCD image sensor 120 is subjected to various processes in an AFE (Analog Front End) 121 and an image processor 122. The image information subjected to various processes is recorded in a flash memory 142 or a memory card 140. The image information recorded in the flash memory 142 or the memory card 140 is displayed on the liquid crystal display monitor 123 according to an operation performed on an operation unit 150 by a user. Details of the configurations shown in FIGS. 1 to 3 will be described below.

The optical system 110 includes a focus lens 111, a zoom lens 112, a diaphragm 113, a shutter 114, and the like. The optical system 110 may include an optical camera shake correction lens (OIS: Optical Image Stabilizer) (not shown). Each of lenses included in the optical system 110 may be realized in any number of lenses or any number of lens groups.

The focus lens 111 is used to adjust focus state of a subject. The zoom lens 112 is used to adjust an angle of view of a subject. The diaphragm 113 is used to adjust amount of light incident on the CCD image sensor 120. The shutter 114 adjusts the exposure time of light incident on the CCD image sensor 120. The focus lens 111, the zoom lens 112, the diaphragm 113, and the shutter 114 are driven by the respective drivers such as DC motors or stepping motors, according to control signals provided from a controller 130.

The CCD image sensor 120 captures a subject image formed through the optical system 110 and generates image information. The CCD image sensor 120 has multiple photodiodes arranged two-dimensionally on its light-receiving plane. In addition, color filters of primary colors R, G, and B are arranged corresponding to the respective photodiodes in a predetermined arrangement. Light from a subject to be recorded passes through the optical system 110, is imaged on the light-receiving surface of the CCD image sensor 120, and is converted into an electrical signal indicating image information. Then the electrical signal is supplied to the subsequent AFE 121.

In addition, the CCD image sensor 120 operates based on some drive modes associated with operation modes of the digital camera 100. The operation modes of the digital camera 100 include a playback mode and a recording mode. The recording mode includes a still image recording operation mode, a moving image recording operation mode, a through image recording operation mode and the like.

The AFE 121 performs noise suppression with correlated double sampling, gain multiplication based on an ISO sensitivity with an analog gain controller, and AD conversion with an AD converter, on the image information inputted from the CCD image sensor 120. Thereafter, the AFE 121 outputs the image information to the image processor 122.

The image processor 122 performs various processes on the image information outputted from the AFE 121. The various processes include, for example, adding up of BMS (block memories), smear correction, white balance correction, gamma correction, a YC conversion process, an electronic zoom process, a compression process, and a decompression process, but are not limited thereto. The image processor 122 may be composed of a hard-wired electronic circuit or a microcalculater using a program, etc. Alternatively, the image processor 122 may be made in a single semiconductor chip together with other functional units such as the controller 130.

A temperature sensor 161 measures a temperature associated with or of a case of the digital camera 100. Then, the temperature sensor 161 notifies the controller 130 of a measurement of the temperature in the case. Now, the temperature in the case of the digital camera 100 will be described.

Figure 4:
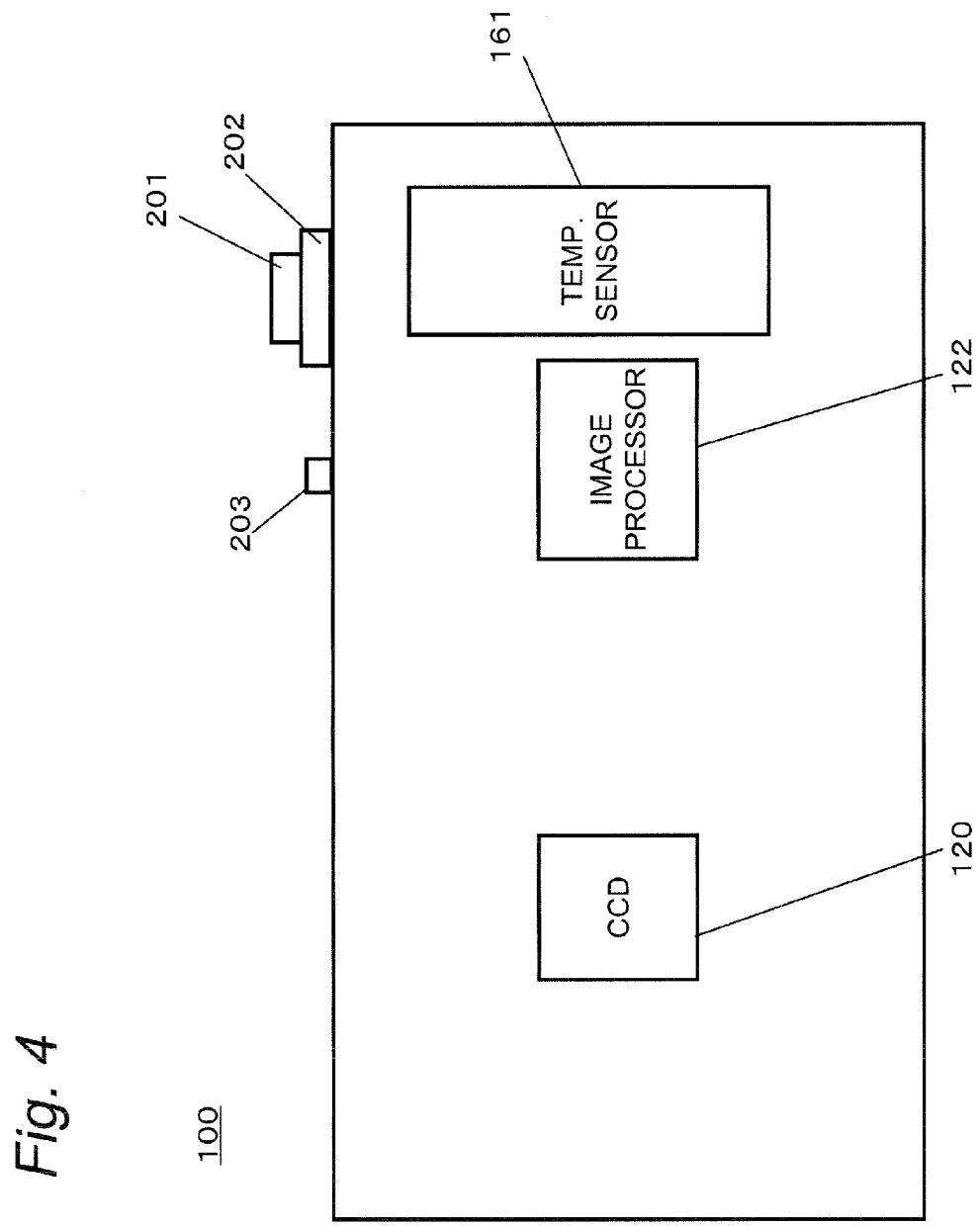
FIG. 4 is a diagram showing an internal configuration of the digital camera.

FIG. 4 is a diagram of an internal configuration of the digital camera 100 as viewed from the back face thereof. As shown in FIG. 4, the CCD image sensor 120 is disposed at a location corresponding to the optical system 110. In addition, though not shown in FIG. 4, a card slot 141 and a battery case (not shown) are disposed on the right side of the digital camera 100 as viewed from the back face thereof, and the image processor 122 is disposed at a location facing the card slot 141 and the battery case. In addition, the temperature sensor 161 is disposed in a grip portion used by the user to hold the digital camera 100. When a state in which the CCD image sensor 120 and the image processor 122 operate continuously for a long time such as during moving image recording, the CCD image sensor 120 and the image processor 122 generate heat. Correspondingly, the temperature in the case of the digital camera 100 rises. Heat generating members such as the CCD image sensor 120 and the image processor 122 are disposed at locations roughly symmetrical with respect to the center in a horizontal direction of the case. Hence, the temperature distribution in the case of the digital camera 100 is roughly bilaterally symmetrical. Upon shooting an image, the user often holds the left and right edge portions of the digital camera 100 with both hands. Thus, it can be estimated that when the temperature sensor 161 is disposed in either one of the left and right grips in the case of the digital camera 100, an equivalent result of measurement is also obtained for the other one. In the first embodiment, assuming the case in which shooting is performed by the user holding the digital camera 100 with one hand, the temperature sensor 161 is disposed in a grip on the right hand side where operating members such as the release button 201 and the zoom lever 202 are disposed.

The liquid crystal display monitor 123 is provided on the back face of the digital camera 100. The liquid crystal display monitor 123 displays an image created based on the image information processed by the image processor 122. Images to be displayed on the liquid crystal display monitor 123 include a through image and a recorded image. The through image is an image obtained by continuously displaying frame images which are created every certain period of time by the CCD image sensor 120. Normally, when the digital camera 100 is in the recording mode, the image processor 122 creates a through image from image information generated by the CCD image sensor 120. By seeing a through image displayed on the liquid crystal display monitor 123, a user can shoot an image while checking a composition of an image. The recorded image is an image obtained by resizing a moving image of high pixel size or a still image of high pixel size recorded in the memory card 140, etc., to an image of low pixel size to display the image on the liquid crystal display monitor 123, when the digital camera 100 is in the playback mode.

The controller 130 controls the entire operation of the digital camera 100. The controller 130 may be composed of a hard-wired electronic circuit, a microcalculater, or the like. Alternatively, the controller 130 may be made in a single semiconductor chip together with the image processor 122, etc.

The flash memory 142 functions as an internal memory for recording image information and the like. In addition, the flash memory 142 stores therein programs for performing overall control of the entire operation of the digital camera 100, in addition to programs relating to autofocus control (AF control), automatic exposure control (AE control), and light emission control of the flash 160. In addition, the flash memory 142 stores therein association information between setup moving image recording modes and a temperature rise rate, as shown in FIG. 5. The controller 130 can recognize a temperature rise rate for a moving image recording mode to be set, by accessing the flash memory 142.

A buffer memory 124 is storage means that functions as a working memory for the image processor 122 and the controller 130. The buffer memory 124 can be realized by a DRAM (Dynamic Random Access Memory) and the like.

The card slot 141 is connection means that allows the memory card 140 to be inserted therein and removed therefrom. The card slot 141 allows the memory card 140 to be electrically and mechanically connected thereto. In addition, the card slot 141 may have a function of controlling the memory card 140. The memory card 140 is an external memory including a storing unit such as a flash memory. The memory card 140 can record data such as image information processed by the image processor 122.

A microphone 162 collects sounds around the digital camera 100 to convert the sounds into an electrical signal indicating audio information. The audio information converted into the electrical signal is recorded in the memory card 140. The microphone 162 operates when the digital camera 100 is set to an audio recording mode or a moving image recording mode. The microphone 162 is disposed on the top of the digital camera 100 (not shown), but the location thereof is not limited thereto.

A speaker 163 converts the audio information recorded in the memory card 140 into human-audible sound and emits the sound. The speaker 163 operates when playing back audio information or moving image information recorded in the memory card 140 in the playback mode. The speaker 163 is disposed on the top of the digital camera 100 (not shown), but the position is not limited thereto.

The operation unit 150 is a collective term for operation buttons and an operation lever provided on the exterior of the digital camera 100, and receives operations performed by the user. The operation unit 150 includes, for example, the release button 201, the zoom lever 202, the power button 203, the center button 204, the cross button 205, and the moving image recording button 206 which are shown in FIGS. 1 and 2. Upon receipt of operations performed by the user, the operation unit 150 sends various operation command signals to the controller 130.

The release button 201 is a button to be pressed that can take two states: a half-pressed state and a full-pressed state. When the release button 201 is half-pressed by the user, the controller 130 performs auto focus (AF) control and auto exposure (AE) control to determine a recording condition. Then, when the release button 201 is full-pressed by the user, the controller 130 records, as a still image, image information generated by the CCD image sensor 120 at the timing of the full-press, in the memory card 140 and the like.

The zoom lever 202 is a lever that has a wide-angle end and a telephoto end for view angle adjustment and can return to a central position by itself. When the zoom lever 202 is operated by the user, the zoom lever 202 sends an operation command signal for driving the zoom lens 112 to the controller 130. Specifically, when the zoom lever 202 is operated to the wide-angle end, the controller 130 drives the zoom lens 112 to zoom out a subject. Likewise, when the zoom lever 202 is operated to the telephoto end, the controller 130 drives the zoom lens 112 to zoom in a subject.

The power button 203 is a button to be pressed for turning on/off of supplying of power to each of units included in the digital camera 100. When the power button 203 is pressed by the user with the digital camera powered off, the controller 130 supplies power to each unit included in the digital camera 100 to activate them. When the power button 203 is pressed by the user with the digital camera 100 powered on, the controller 130 stops the supplying of power to each unit.

The moving image recording button 206 is a button to be pressed. When the moving image recording button 206 is pressed while the digital camera 100 is in the recording mode and is in a recording standby state in which the liquid crystal display monitor 123 displays a through image, the controller 130 starts a moving image recording operation. When the moving image recording operation starts, the CCD image sensor 120 and the image processor 122 generate moving image information according to a specified moving image recoding mode. In addition, at this time, the microphone 162 collects sounds to generate audio information. Then, the image processor 122 performs a multiplexing process on the generated moving image information and audio information according to a predetermined moving image recording format to generate moving image information with sound. The controller 130 continuously records moving image information with sound to be generated, in the memory card 140. When the moving image recording button 206 is pressed while the digital camera 100 is in a moving image recording state, the controller 130 terminates the moving image recording operation.

The center button 204 is a button to be pressed. When the center button 204 is pressed by the user while the digital camera 100 is in the recording mode or the playback mode, the controller 130 displays a menu screen on the liquid crystal display monitor 123. The menu screen is a screen for setting various conditions for recording/playback of images. When the center button 204 is pressed with a setting item for various conditions being selected, the center button 204 also functions as a set button.

The cross button 205 is a button to be pressed in left, right, up, or down direction. The user can make a selection from among various items displayed on the liquid crystal display monitor 123 by pressing the cross button 205 in one of directions.

1-1-2. Moving Image Recording Mode

The digital camera 100 of the present embodiment has a plurality of moving image recording modes for setting the image quality and size of a moving image to be recorded. A moving image recording mode can be specified (set) by the user through the operation unit 150. Upon a moving image recording operation, the controller 130 sets a moving image recording mode for setting the image quality and size of a moving image to be recorded, which is specified through the operation unit 150, on the CCD image sensor 120 and the image processor 122. A plurality of moving image recording modes are prepared, including a first moving image recording mode which enables moving image recording with high image quality to a fourth moving image recording mode which enables moving image recording with low image quality. FIG. 5 is a diagram for describing temperature rise rates in the case for the respective moving image recording modes. Note that FIG. 5 shows a relationship between each moving image recording mode and a rate of temperature rise of the case when the digital camera 100 is continuously operated in the moving image recording mode, with the case of the digital camera 100 being at a predetermined reference temperature (e.g., a temperature higher than ambient temperature (e.g., 27° C.)).

In a first moving image recording mode, the CCD image sensor 120 outputs an image of full high-definition size (1920 dots×1080 dots) with 60 frames per second in a progressive scheme. Then, the image processor 122 performs a compression process on the output image.

In a second moving image recording mode, the CCD image sensor 120 outputs an image of full high-definition size with 60 frames per second by a progressive scheme. Then, the image processor 122 performs a thinning-out process on the output image according to an interlaced scheme and thereafter performs a compression process on the image.

In a third moving image recording mode, the CCD image sensor 120 outputs an image of high-definition size (1280 dots×720 dots) with 60 frames per second by a progressive scheme. Then, the image processor 122 performs a compression process on the output image.

In a fourth moving image recording mode, the CCD image sensor 120 outputs an image of high-definition size with 30 frames per second by a progressive scheme. Then, the image processor 122 performs a compression process on the output image.

A temperature in the case of the digital camera 100 to be reached when the digital camera 100 is continuously operated in each moving image recording mode is determined depending on relationship between heat radiation and heat generation. Specifically, in modes in which moving image recording can be performed with high image quality (the first and second moving image recording modes), since loads of processing in the CCD image sensor 120 and the image processor 122 are high, the amount of heat generated is large and thus exceeds the amount of heat radiated. Accordingly, the temperature in the case of the digital camera 100 rises. When a recording operation continues in such moving image recording modes, the temperature in the case rises and eventually reaches a recording stop temperature (a detail will be described later). In this case, the temperature rise rate in the case of the digital camera 100 is positive.

On the other hand, in modes in which moving image recording is performed with low image quality or at small image size (the third and fourth moving image recording modes), since the processing loads of the CCD image sensor 120 and the image processor 122 are low, the amount of heat generated is small. In this case, when a recording operation continues in such a moving image recording mode, the temperature in the case of the digital camera 100 finally reaches a constant temperature at which heat radiation and heat generation are kept in balance (a temperature lower than the recording stop temperature). Even if a recording operation continues in such a moving image recording mode, the temperature in the case does not reach the recording stop temperature. Note that FIG. 5 shows an example in which, when a recording operation continues in the third or fourth moving image recording mode, since a reference temperature at the start is higher than a temperature to be reached finally, the temperature in the case of the digital camera 100 drops from the reference temperature obtained at the start. In this case, the temperature rise rate in the case is negative.

Namely, in the first moving image recoding mode, although moving image recording can be performed with high image quality, the temperature rise rate in the case is high. In the second moving image recording mode, a compression process is performed on an output image subjected to a thinning-out process, and thus the load in the compression process performed by the image processor 122 is reduced compared to the first moving image recoding mode. Hence, the temperature rise rate in the case is slightly lower than that in the first moving image recording mode. In the third moving image recording mode, a size of the output image is smaller than that in the first and second moving image recording modes, the load of the outputting operation of the CCD image sensor 120 and the load of processing of the image processor 122 are reduced so that the temperature rise rate in the case tends to be in slightly down. The fourth moving image recording mode is for a moving image recording with low image quality, and thus the output frame rate is lower than those in other moving image recording modes. Hence, the processing load of the CCD image sensor 120 and the processing load of the image processor 122 are further reduced and thus the temperature rise rate in the case tends to be in down. Note that the relationship between the moving image recording modes and the temperature rise rates as shown in FIG. 5 is an example and thus, needless to say, such a relationship changes depending on the case size of the digital camera 100, the specification of the CCD image sensor 120 and the image processor 122 and the like. In the present embodiment, the following description is made based on the relationship as shown in FIG. 5. Note that a desired moving image recording mode may be set by a user in advance on the controller 130 before starting a moving image recording operation.

The controller 130 calculates a remaining recording time for moving image recording, based on a temperature in the case measured by the temperature sensor 161. For example, the controller 130 can grasp a temporal change in temperature in the case by monitoring the temperature in the case every predetermined time. The controller 130 can calculate a time to be elapsed before the temperature in the case reaches the recording stop temperature (i.e., remaining time for recording a moving image) by using a newly measured temperature in the case and a temporal change in temperature in the case which is currently grasped. Furthermore, the controller 130 calculates a remaining recording time for moving image recording, based on a remaining storage capacity (that is, amount of free space) of the memory card 140. The controller 130 can calculate time that elapses before the memory card 140 runs out of its storage capacity (i.e., remaining recording time) by using a change in the remaining storage capacity of the memory card 140 per unit time for a moving image which is currently recorded, and remaining storage capacity at the present time of the memory card 140.

1-1-3. Correspondences of Terms

In the present embodiment, the CCD image sensor 120 and the image processor 122 are examples of a moving image creating unit. The temperature sensor 161 is an example of a temperature sensor. The memory card 140 is an example of a recording medium. The liquid crystal display monitor 123 is an example of a display unit. The controller 130 is examples of a computing unit, a display controller or recording controller, and a recording stopping unit. The digital camera 100 is an example of an imaging apparatus. The recording stop temperature is an example of a first predetermined temperature, and a warning temperature is an example of a second predetermined temperature. The first and second moving image recording modes are examples of a first recording mode, and the third and fourth moving image recording modes are examples of a second recording mode.

1-2. Operation

Figure 6:
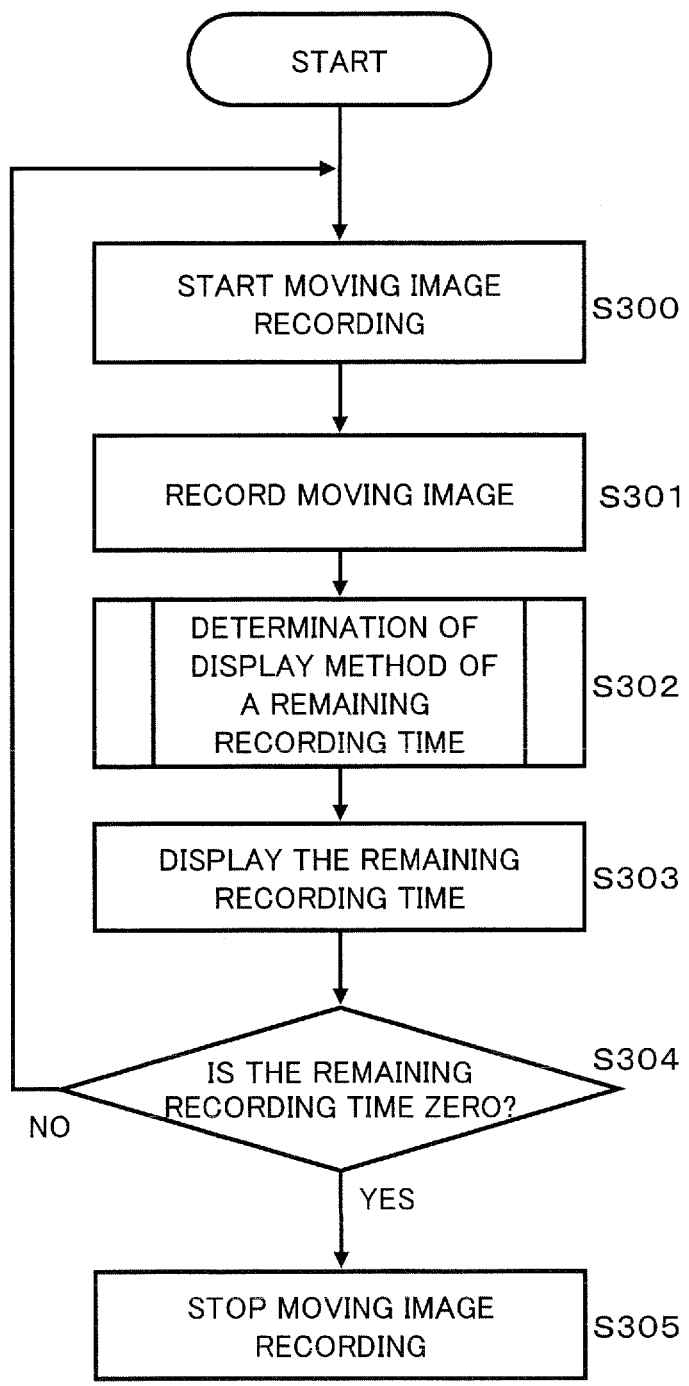
FIG. 6 is a flowchart of an operation for displaying a remaining recording time during a moving image recording.

An operation of the digital camera 100 for displaying a remaining recording time during a moving image recording will be described. FIG. 6 is a flowchart of operation of displaying the remaining recording time during the moving image recording.

When the controller 130 receives user's operation of pressing the moving image recording button 206 at a recording standby state of the digital camera 100, the controller 130 starts a moving image recording operation (S300). The controller 130 continues the moving image recording until receiving user's operation of pressing of the moving image recording button 206 again, as long as there are no problems in the temperature in the case, the storage capacity of the memory card 140, the remaining amount of battery and the like. (S301).

During the moving image recording, the controller 130 determines a method of displaying the remaining recording time for the moving image recording, according to the temperature in the case of the digital camera 100 (S302). Specifically, the controller 130 determines whether to display, as the remaining recording time for the moving image recording, the remaining recording time which is calculated based on the temperature in the case of the digital camera 100, or the remaining recording time which is calculated based on the storage capacity of the memory card 140. A detail of the determination of a method of displaying the remaining recording time for the moving image recording in step S302 will be described later.

Subsequently, the controller 130 displays the remaining recording time for the moving image recording on the liquid crystal display monitor 123, according to the method of displaying the remaining recording time which is determined in step S302 (S303). Specifically, the controller 130 displays, on the liquid crystal display monitor 123, either one of the remaining recording time calculated based on the temperature in the case of the digital camera 100 and the remaining recording time calculated based on the storage capacity of the memory card 140.

Figure 7:
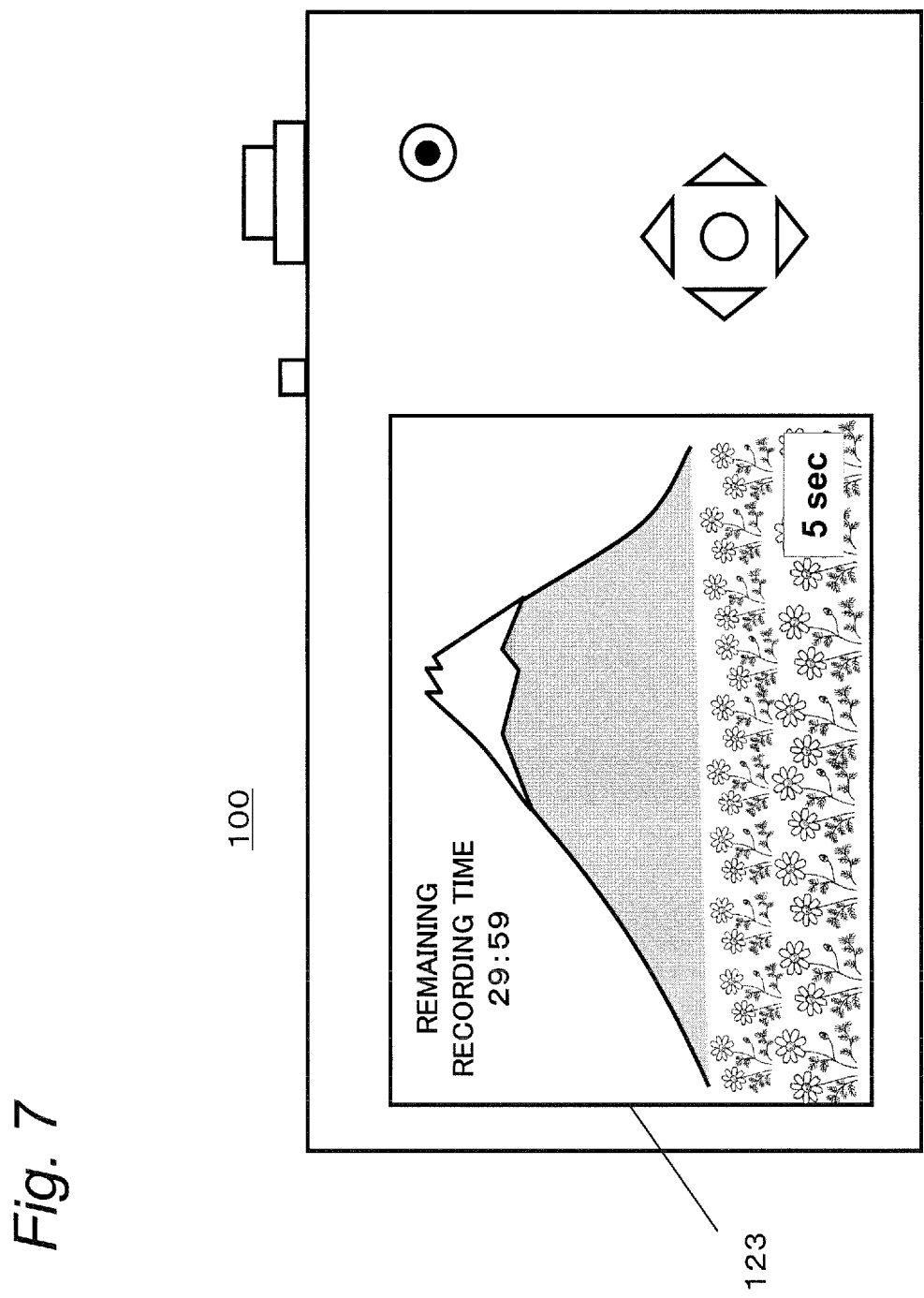
FIG. 7 is a diagram showing an example display of a remaining recording time.

FIG. 7 is a diagram showing an example of display of the remaining recording time for moving image recording. As shown in FIG. 7, a moving image (through image) which is being recorded is displayed on the liquid crystal display monitor 123, and the remaining recording time is displayed in the upper left portion of the liquid crystal display monitor 123. In the example of FIG. 7, "29 minutes 59 seconds" is displayed as the remaining recording time. In addition, the elapsed time since the start of the moving image recording is displayed in the lower right portion of the liquid crystal display monitor 123. In the example of FIG. 7, "5 sec" is displayed as the elapsed time since the start of the moving image recording. Note that a location of displaying the remaining recording time and a location of displaying the elapsed time since the start of moving image recording on the liquid crystal display monitor 123 can be appropriately changed, and are not limited to the above-described examples.

The controller 130 repeats the operations in steps S300 to S304 until the remaining recording time for the moving image recording reaches zero. If the remaining recording time for the moving image recording reaches zero, the controller 130 forcedly terminates the moving image recording operation (S305).

Figure 8:
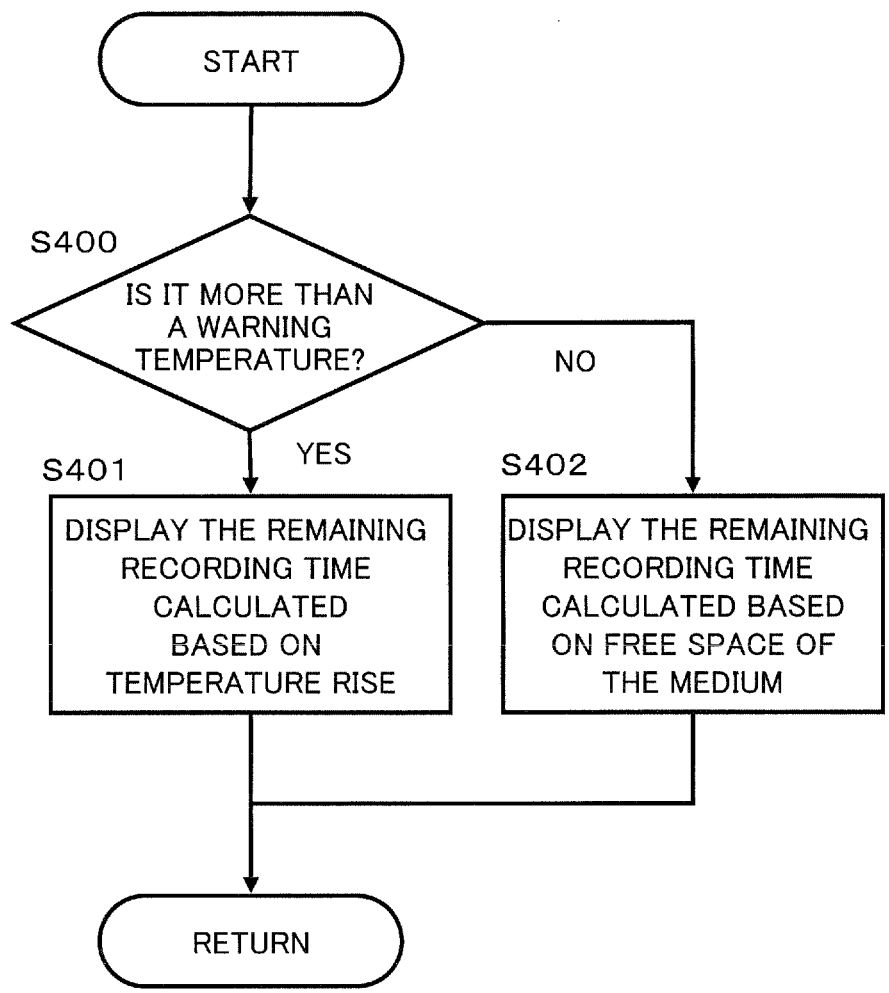
FIG. 8 is a flowchart of determination whether to switch display of the remaining recording time according to a first embodiment.

Next, the determination of a method of displaying a remaining recording time in the above-described step S302 will be described. FIG. 8 is a flowchart showing a process of determining the method of displaying a remaining recording time.

The controller 130 predetermines a warning temperature (first threshold value) and a recording stop temperature (second threshold value) as threshold values for temperature. The recording stop temperature (second threshold value) is a temperature serving as a criterion for determining whether to forcibly stop moving image recording in order to avoid trouble, which is caused by a temperature rise, in terms of control or operation of the digital camera 100. The warning temperature (first threshold value) is a temperature serving as a criterion for determining whether to provide a warning informing that the temperature soon reaches the recording stop temperature.

The controller 130 monitors a result of measurement by the temperature sensor 161 during moving image recording (S400). If a temperature indicated by the result of measurement by the temperature sensor 161 is higher than or equal to the warning temperature (first threshold value) (YES in S400), then the controller 130 determines to perform displaying of the remaining recording time which is based on a temperature rise (S401). On the other hand, if a temperature indicated by the result of measurement by the temperature sensor 161 is lower than the warning temperature (NO in S400), then the controller 130 determines to perform displaying of the remaining recording time which is based on the remaining storage capacity of the memory card 140 (S402).

Figure 9:
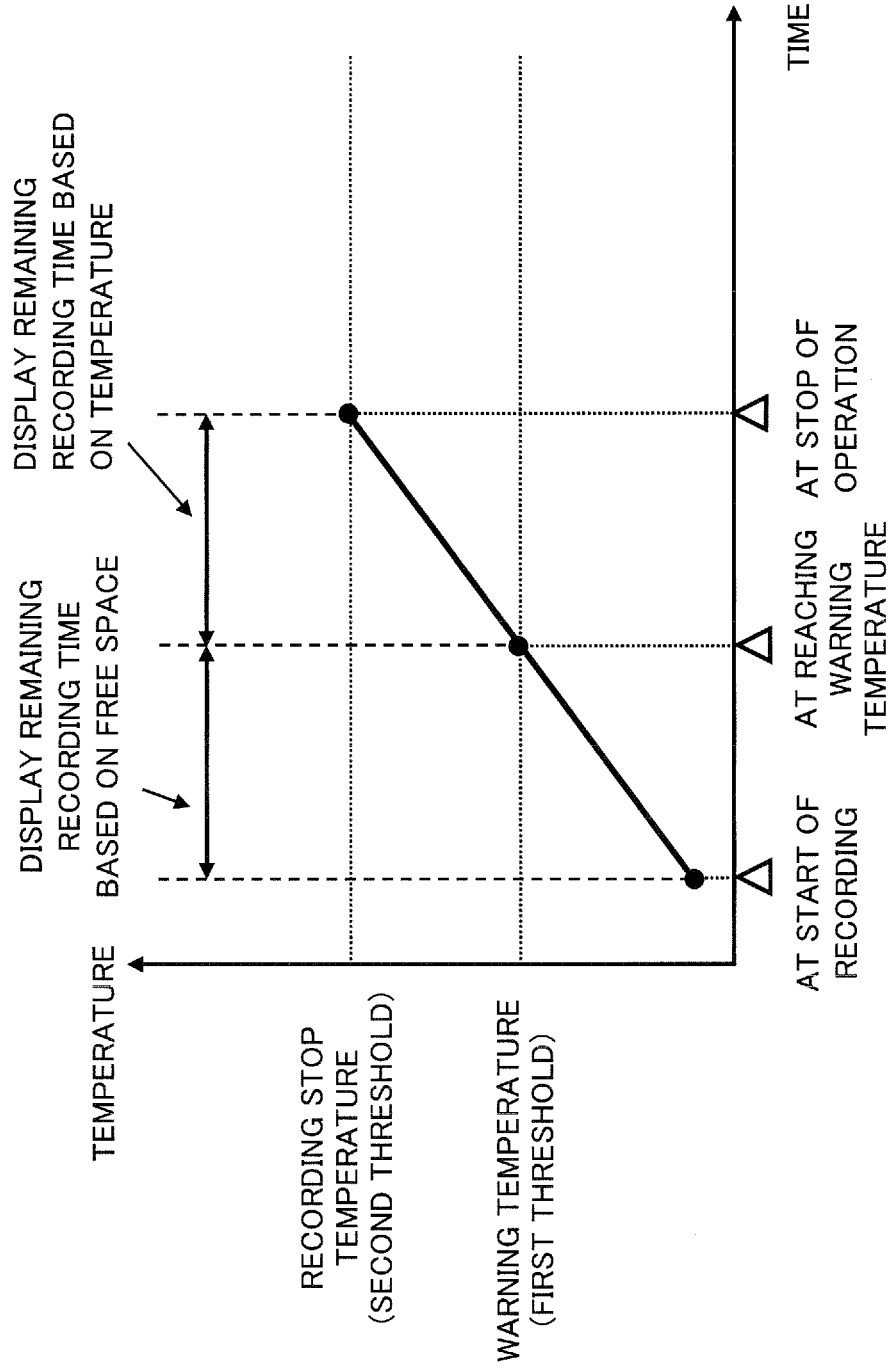
FIG. 9 is a diagram for describing a control performed when the temperature rises along with passage of time.

A control operation performed when the temperature rises along with the passage of time during moving image recording will be described. FIG. 9 is a diagram for describing control performed when the temperature rises along with the passage of time. In FIG. 9, a horizontal axis represents the passage of time and a vertical axis represents a temperature rise inside the case of the digital camera 100. When a moving image recording operation starts, the temperature in the case of the digital camera 100 rises due to heat generation of the CCD image sensor 120 and the image processor 122. The temperature in the case eventually exceeds the warning temperature (first threshold value) and reaches the recording stop temperature (second threshold value). At this time, even if the user is shooting a moving image, the controller 130 forcibly stops the moving image recording.

However, when the user is shooting a moving image of a scene which the user wants to continue moving image recording for a long period of time, if the moving image recording operation is suddenly stopped due to a temperature measured by the temperature sensor 161 which exceeds the threshold value, the user may not be able to record a scene that the user considers important, causing the user to be dissatisfied. In view of this, in the present embodiment, when a measured temperature in the case rises, the digital camera 100 displays the remaining recording time which is calculated based on the temperature. By this, the user can grasp beforehand the timing at which moving image recording is stopped, and thus can take measures, if necessary, to extend the moving image recording time such as switching the mode to a moving image recording mode with a low temperature rise rate.

1-3. Summary

As described above, a digital camera 100 according to the first embodiment is an imaging apparatus capable of recording a moving image, and includes a CCD image sensor 120 and an image processor 122 that create a moving image based on a subject image, an operation unit 150 that sets one of a plurality of recording modes which decide image quality of a moving image to be recorded, a temperature sensor 161 that measures a temperature inside a case, a liquid crystal display monitor 123 capable of displaying a remaining recording time which indicates a time for which the digital camera 100 can record the moving image, and a controller 130 that controls the liquid crystal display monitor 123. The plurality of recording modes include a first or second moving image recording mode (first recording mode) in which, when the CCD image sensor 120 and the image processor 122 continuously operate in the first or second recording mode, the CCD image sensor 120 and the image processor 122 generate heat so that the temperature in the case reaches a recording stop temperature, and a third or fourth moving image recording mode (second recording mode) in which, when the CCD image sensor 120 and the image processor 122 continuously operate in the third or fourth recording mode, the CCD image sensor 120 and the image processor 122 generate heat so that the temperature in the case cannot reach the recording stop temperature. The controller 130 determines the remaining recording time based on the temperature in the case indicated by a result of the measurement by the temperature sensor 161, and further determines whether the recording mode set by the operation unit 150 is the first recording mode and determines, based on a result of the determination, whether to display the remaining recording time which is determined based on the temperature in the case, on the liquid crystal display monitor 123.

By such a configuration, since the remaining recording time for a moving image which is determined based on the temperature in the case is displayed on the liquid crystal display monitor 123, the user can grasp beforehand a situation in which moving image recording may stop due to the influence of a measured temperature in the case. Accordingly, the user can take an appropriate measures to extend the moving image recording time.

In addition, in the digital camera 100, the controller 130 performs control to record the created moving image in a memory card 140. Then, when the temperature indicated by the result of the measurement by the temperature sensor 161 is higher than or equal to a warning temperature, the controller 130 calculates time remaining to allow the CCD image sensor 120 and the image processor 122 to create a moving image, based on the result of the measurement by the temperature sensor 161, and when the temperature indicated by the result of the measurement by the temperature sensor 161 is lower than the warning temperature, the controller 130 calculates time remaining to allow the CCD image sensor 120 and the image processor 122 to create a moving image, based on remaining storage capacity of the memory card 140. By this configuration, when a temperature indicated by a result of measurement by the temperature sensor 161 is lower than the warning temperature (i.e., when the digital camera 100 is not in a situation in which moving image recording may stop), the digital camera 100 can present the user with the remaining recording time for a moving image based on the remaining storage capacity of the memory card 140 which more greatly affects the remaining recording time for the moving image recording than the temperature in the case.

Second Embodiment

A digital camera 100 of the present embodiment differs from the above-described first embodiment in a method of displaying remaining recording time for moving image recording. Specifically, the digital camera 100 of a second embodiment differs in determination of a method of displaying a remaining recording time in step S302 in an operation flow of the first embodiment shown in FIG. 6. The configuration of the digital camera 100 and those processes other than that in step S302 are the same as those in the case of the first embodiment and thus description thereof is omitted. In the drawings, the same configurations or operations are denoted by the same reference numerals.

2-1. Operation

Figure 10:
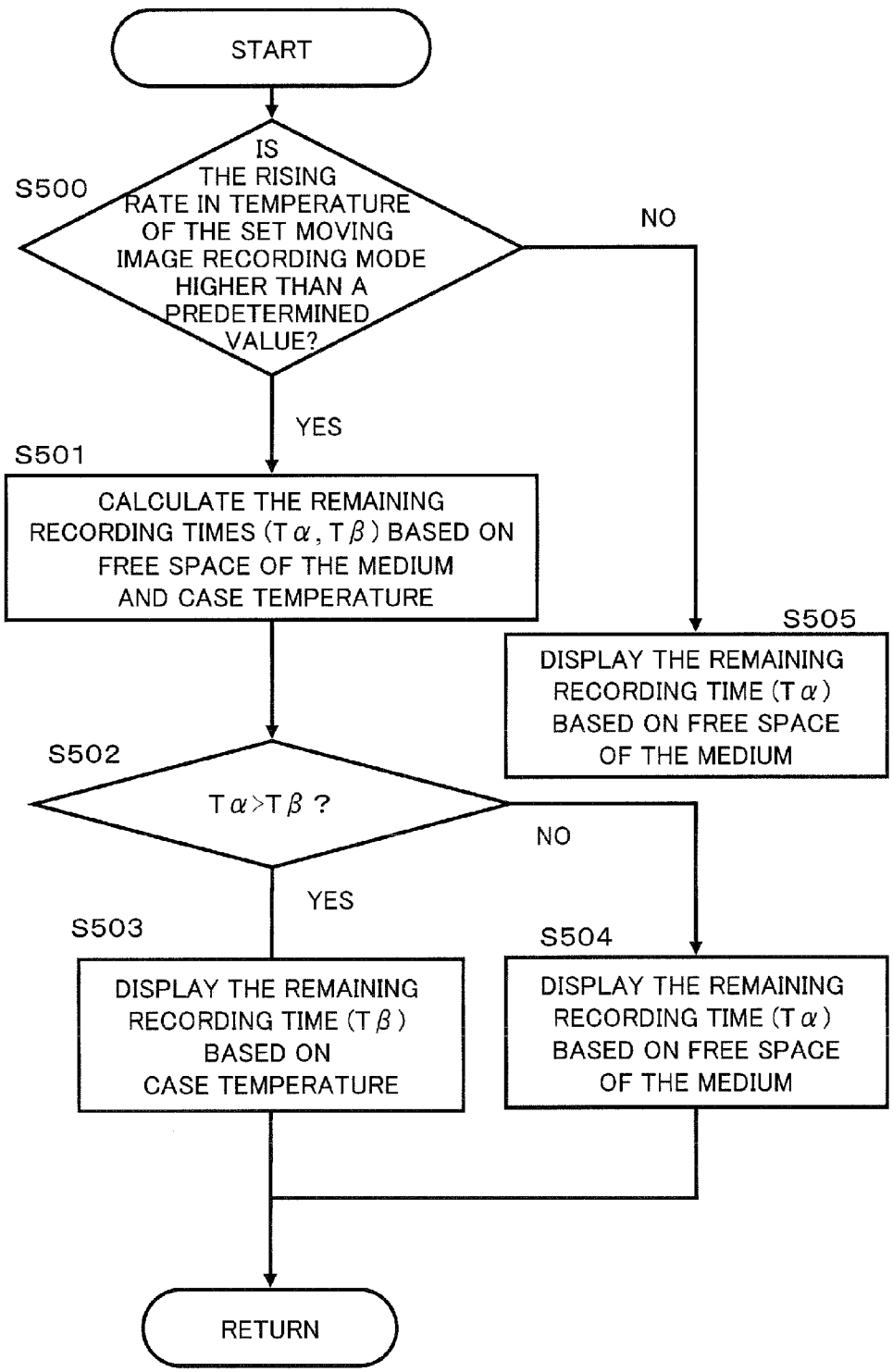
FIG. 10 is a flowchart of determination whether to switch display of the remaining recording time according to a second embodiment.

Another example of a process of determining a method of displaying a remaining recording time in step S302 in the first embodiment will be described. FIG. 10 is a flowchart of a process of determining a method of displaying a remaining recording time in the second embodiment.

First, the controller 130 determines whether a moving image recording mode in which the temperature in the case of the digital camera 100 rises (i.e., a moving image recording mode in which the temperature rise rate is higher than a predetermined value) is set (S500). Specifically, when a first moving image recording mode or a second moving image recording mode is set, the controller 130 determines that the temperature in the case of the digital camera 100 rises. When a third moving image recording mode or a fourth moving image recording mode is set, the controller 130 determines that the temperature in the case of the digital camera 100 drops.

When a moving image recording mode in which the temperature in the case of the digital camera 100 drops is set, it is considered that there is no temperature rise of the case due to heat generation by a CCD image sensor 120 and an image processor 122, and thus, the temperature in the case does not reach a recording stop temperature. In this case, remaining recording time is affected more by the remaining storage capacity of a memory card 140 than by the temperature in the case. Hence, if a moving image recording mode in which the temperature in the case of the digital camera 100 drops is set (NO in S500), then the controller 130 determines to display, on a liquid crystal display monitor 123, the remaining recording time which is calculated based on the remaining storage capacity of the memory card 140 (S505).

On the other hand, if a moving image recording mode in which the temperature in the case of the digital camera 100 rises is set (YES in S500), then the controller 130 determines which one of the temperature in the case of the digital camera 100 and the remaining storage capacity of the memory card 140 affects more the remaining recording time. Specifically, the controller 130 determines a remaining recording time (Tα) based on the remaining storage capacity of the memory card 140 and a remaining recording time (Tβ) based on the temperature in the case of the digital camera 100 (S501). Then, the controller 130 compares the remaining recording time (Tα) based on the remaining storage capacity of the memory card 140 with the remaining recording time (Tβ) based on the temperature in the case of the digital camera 100, to determine which one of them is shorter (S502).

If it is determined that the remaining recording time (Tβ) based on the temperature in the case of the digital camera 100 is shorter (YES in S502), then the controller 130 determines to display, on the liquid crystal display monitor 123, the remaining recording time (Tβ) based on the temperature in the case (S503). On the other hand, if it is determined that the remaining recording time (Tα) based on the remaining storage capacity of the memory card 140 is shorter (NO in S502), then the controller 130 determines to display, on the liquid crystal display monitor 123, the remaining recording time (Tα) based on the remaining storage capacity of the memory card 140 (S504).

As described above, the controller 130 can selectively display, on the liquid crystal display monitor 123, one of remaining recording time based on the temperature in the case of the digital camera 100 and the remaining recording time based on the remaining storage capacity of the memory card 140 that is more appropriate to set the remaining recording time for moving image recording.

2-2. Summary

In the digital camera 100 according to the second embodiment, the controller 130 performs control to record a created moving image in the memory card 140. In addition, the controller 130 specifies a moving image recording mode used for creating a moving image, to the CCD image sensor 120 and the image processor 122. Then, the controller 130 determines, according to the specified moving image recording mode, whether to calculate the remaining time for which the CCD image sensor 120 and the image processor 122 can create a moving image, based on the measurement by a temperature sensor 161 or based on the remaining storage capacity of the memory card 140. By this, the digital camera 100 can present the user with the remaining recording time (creation time) for a moving image of a type suited to the specified moving image recording mode.

In addition, in the digital camera 100 according to the above-described embodiment, when the specified moving image recording mode is a moving image recording mode in which the temperature in the case rises upon creation of a moving image, the controller 130 displays, on the liquid crystal display monitor 123, a shorter one of the remaining time calculated based on a result of measurement by the temperature sensor 161 and the remaining time calculated based on the remaining storage capacity of the memory card 140. By this, the digital camera 100 can present, as a remaining recording time (creation time) for a moving image, the user with one of the times with which the remaining recording time (creation time) for a moving image is affected more.

Other Embodiments

The embodiments are not limited to the above-described embodiments, and various embodiments are considered. Other embodiments will be summarized below.

Although in the above-described embodiments the CCD image sensor 120 is described as an example of an imaging device, the imaging device is not limited thereto. Specifically, the imaging device may be other types of imaging devices such as a CMOS image sensor and an NMOS image sensor.

In the above-described embodiments, FIG. 9 describes an example in which the type of remaining recording time to be displayed is switched depending on whether the temperature in the case of the digital camera 100 is higher than or equal to the warning temperature. However, a method of displaying the remaining recording time is not limited thereto. Specifically, the remaining recording time based on the remaining storage capacity of the memory card 140 and the remaining recording time based on the temperature in the case may be simultaneously displayed. By this, the user can easily determine which one, the remaining recording time based on the remaining storage capacity and the remaining recording time based on the temperature in the case, more greatly affects the remaining recording time for moving image recording.

In the above-described embodiments, the remaining recording time based on the remaining storage capacity of the memory card 140 and the remaining recording time based on the temperature in the case may be displayed in different way. For example, sizes, fonts, or colors may be different. By this, even if switching between display of the remaining recording time based on the remaining storage capacity of the memory card 140 and display of the remaining recording time based on the temperature in the case is performed, the user can judge which information is being displayed.

In the above-described embodiments, although an example in which the remaining recording time is determined by calculation based on the temperature in the case is described, the method of determining the remaining recording time is not limited thereto. Specifically, information on the remaining recording time for the temperature in the case exceeding a warning temperature may be stored in advance in the flash memory 142. When the temperature in the case exceeds the warning temperature, the controller 130 may read information on the remaining recording time from the flash memory 142 and display the information on the liquid crystal display monitor 123.

In the above-described embodiments, when the temperature in the case of the digital camera 100 exceeds the warning temperature, the controller 130 may display a message that suggests changing the moving image recording mode to another, on the liquid crystal display monitor 123. Alternatively, when the controller 130 determines to display the remaining recording time based on the temperature in the case on the liquid crystal display monitor 123, the controller 130 may provide display that suggests changing the moving image recording mode to another, on the liquid crystal display monitor 123. Furthermore, when an operation is performed on the operation unit 150 by the user at any timing during the moving image recording, the controller 130 may make a setting change to another moving image recording mode. Exemplary display on the liquid crystal display monitor 123 for these cases is shown in FIG. 11.

Figure 11:
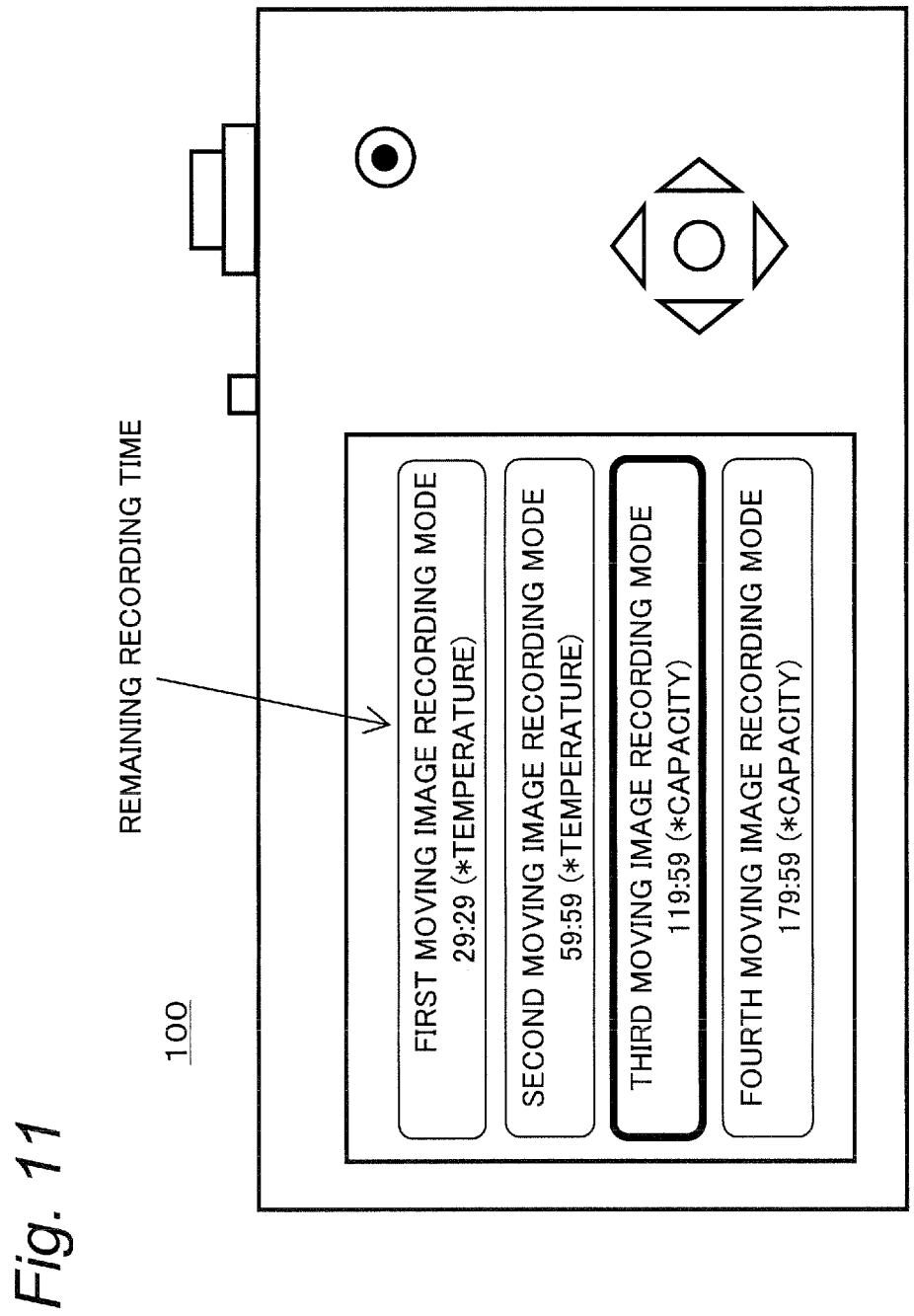
FIG. 11 is a diagram showing a screen for setting a moving image recording mode.

FIG. 11 is a diagram showing an example of a screen for setting a moving image recording mode. As shown in FIG. 11, the remaining recording times for the respective moving image recording modes to be employed may be all displayed on the liquid crystal display monitor 123. At this time, since the first moving image recording mode and the second moving image recording mode are moving image recording modes in which the temperature rises, the temperature in the case may reach a recording stop temperature. Hence, for the first moving image recording mode and the second moving image recording mode, the remaining recording time based on the temperature in the case is displayed. On the other hand, the third moving image recording mode and the fourth moving image recording mode are moving image recording modes in which the temperature drops, and thus, the temperature in the case may not reach the recording stop temperature. Hence, for the third moving image recording mode and the fourth moving image recording mode, the remaining recording time based on the remaining storage capacity of the memory card 140 is displayed. By this, the user can recognize appropriate remaining recording times for the respective settable moving image recording modes and select an appropriate moving image recording mode taking into account the remaining recording time.

In the above-described embodiments, although in the example of FIG. 7 numeric characters representing the remaining recording time are displayed on the liquid crystal display monitor 123, a method of displaying the remaining recording time is not limited thereto. Specifically, the time to be elapsing before the temperature in the case reaches the recording stop temperature may be graphically presented to the user. An example thereof is shown in FIG. 12. As shown in FIG. 12, a graph having a coordinate system in which a horizontal axis represents time and a vertical axis represents temperature may be displayed on the liquid crystal display monitor 123, and the temperature measured by the temperature sensor 161 may be plotted on the graph. At that time, a line representing a recording stop temperature is depicted on the graph. Alternatively, the background color of a region where the temperature exceeds the recording stop temperature may be made different from that of a region where the temperature does not exceed the recording stop temperature. By this, the user can graphically grasp the time elapsing before the temperature in the case reaches the recording stop temperature.

In the flowchart shown in FIG. 10, the processes in steps S502 to S504 may be replaced by the processes in steps S400 to S402 shown in the flowchart of FIG. 8. By this, too, switching between display of the remaining recording time based on the remaining storage capacity of the memory card 140 and display of the remaining recording time based on the temperature in the case is appropriately performed, so that the more appropriate remaining recording time can be presented to the user.

The idea of the above-described embodiments can be applied to both a camera with a built-in lens and a camera including a camera body and an interchangeable lens which is mountable to the camera body.

Industrial Applicability

The idea of the above-described embodiments can be applied to imaging apparatuses capable of recording moving images, which include not only digital cameras but also movie cameras and information terminals with a camera.

What is claimed is:

1. An imaging apparatus comprising:
a moving image creating unit configured to create a moving image based on a subject image;
a setting unit configured to set one of a plurality of recording modes which decide image quality of a moving image to be recorded;
a temperature sensor configured to measure a temperature associated with a case of the imaging apparatus;
a display unit capable of displaying a remaining recording time which indicates a time for which the imaging apparatus can record the moving image; and
a display controller configured to control the display unit, wherein
the plurality of recording modes include a first recording mode in which, when the moving image creating unit continuously operates in the first recording mode, the moving image creating unit generates heat so that the temperature in the case reaches a first predetermined temperature, and a second recording mode in which, when the moving image creating unit continuously operates in the second recording mode, the moving image creating unit generates heat so that the temperature in the case cannot reach the first predetermined temperature, and
the display controller
determines the remaining recording time based on the temperature in the case indicated by a result of the measurement by the temperature sensor; and
determines whether to display a remaining recording time which is determined based on the temperature in the case, on the display based on a result of a determination of whether the recording mode set by the setting unit is the first recording mode unit.

2. The imaging apparatus according to claim 1, further comprising a recording controller configured to performs control to record the moving image created by the moving image creating unit in a recording medium, wherein
the display controller further determines the remaining recording time based on a remaining storage capacity of the recording medium, and
when the recording mode set by the setting unit is the first recording mode, the display controller controls the display unit to display a shorter one of a remaining recording time which is determined based on the temperature in the case and a remaining recording time which is determined based on the storage capacity of the recording medium.

3. The imaging apparatus according to claim 2, wherein the display controller determines the remaining recording time according to the recording mode set by the setting unit.

4. The imaging apparatus according to claim 1, further comprising a recording controller configured to perform control to record the created moving image in a recording medium, wherein
the display controller further determines the remaining recording time based on a remaining storage capacity of the recording medium, and
when the recording mode set by the setting unit is the first recording mode, the display controller
displays, on the display unit, the remaining recording time determined based on the temperature in the case, when the temperature indicated by the result of the measurement by the temperature sensor is higher than a second predetermined temperature; and
displays, on the display unit, the remaining recording time determined based on the storage capacity of the recording medium, when the temperature indicated by the result of the measurement by the temperature sensor is lower than the second predetermined temperature.

5. The imaging apparatus according to claim 4, wherein the second predetermined temperature is lower than the first predetermined temperature.

6. The imaging apparatus according to claim 1, further comprising a recording stopping unit configured to stop the moving image recording operation when the temperature indicated by the result of the measurement by the temperature sensor reaches the first predetermined temperature during a moving image recording operation.

7. An imaging apparatus comprising:
an imaging portion for generating a moving image based upon a subject image and in accordance with an operation mode of the imaging apparatus;
a display unit;
a temperature sensor configured to measure a temperature associated with the imaging apparatus;
a controller coupled to the display unit, imaging portion and the temperature sensor; and
a memory storing instructions for configuring the controller, wherein the instructions configure the controller to:
set the operation mode of the imaging apparatus to one of a a first recording mode and a second recording mode to decide image quality, wherein in the first recording mode the imaging portion continuously operates and the temperature associated with the imaging apparatus reaches a first predetermined temperature, and in the second recording mode the imaging portion continuously operates and the temperature associated with the imaging apparatus cannot reach the first predetermined temperature;
determine a remaining recording time based on the temperature measured by the temperature sensor and the set operation mode of the imaging apparatus; and
control the display unit to display the remaining recording time.

8. The imaging apparatus according to claim 7, wherein the controller is further configured to:
record the moving image in a recording medium;
determine the remaining recording time further based on a remaining storage capacity of the recording medium; and control the display unit to display a shorter one of a remaining recording time which is determined based on the temperature and a remaining recording time which is determined based on the storage capacity of the recording medium when the set operating mode is the first recording mode.

* * * * *